(12) United States Patent
Yamazaki et al.

(10) Patent No.: US 6,372,155 B1
(45) Date of Patent: *Apr. 16, 2002

(54) OXIDE GLASS SHOWING LONG AFTERGLOW AND ACCELERATED PHOSPHORESCENCE

(75) Inventors: Masaaki Yamazaki; Yoshinori Yamamoto; Naruhito Sawanobori; Shinobu Nagahama, all of Saitama-ken (JP)

(73) Assignee: Sumita Optical Glass, Inc., Saitama-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/445,296

(22) PCT Filed: Mar. 30, 1999

(86) PCT No.: PCT/JP99/01642

§ 371 Date: Nov. 30, 1999

§ 102(e) Date: Nov. 30, 1999

(87) PCT Pub. No.: WO99/50198

PCT Pub. Date: Oct. 7, 1999

(30) Foreign Application Priority Data

Apr. 1, 1998 (JP) ............................................ 10-088674
Jun. 25, 1998 (JP) ............................................ 10-178624
Mar. 26, 1999 (JP) ............................................ 11-082866

(51) Int. Cl.$^7$ .............................. C09K 11/00; C03C 4/12
(52) U.S. Cl. ........................ 252/301.4 R; 252/301.4 R; 252/301.6 R; 252/301.6 F; 501/63; 501/65; 501/66; 501/67; 501/69; 501/70; 501/72; 501/73; 501/78; 501/79
(58) Field of Search ................... 252/301.4 R, 301.4 F; 252/301.6 R, 301.6 F; 501/63, 65, 66, 67, 69, 70, 72, 73, 78, 79

(56) References Cited

U.S. PATENT DOCUMENTS 4,751,148 A * 6/1988 Popma et al. ......... 252/301.4 R
4,798,768 A * 1/1989 Oversluizen et al. . 252/301.4 R
6,123,872 A * 9/2000 Yamazaki et al. .... 252/301.4 R

FOREIGN PATENT DOCUMENTS

JP          61-242925       * 10/1986

OTHER PUBLICATIONS

Journal of Physics: Condensed Matter, vol. 10, No. 42, issued Oct. 26, 1998, H. Hosono et al., "Long lasting phosphorescence properties of $Tb^{3}+$ —activated reduced calcium aluminate glasses", p.9541–9547. Particularly refer to p.9542, 3. Experiment.

Journal of Non–Crystalline Solids, vol. 241, No. 1, issued Nov. 1, 1998, M. Yamazaki et al., "Long luminescent glass: $Tb^{3}+$—activated $ZnO–B_2O–SiO_2$ glass", p.71–73.

* cited by examiner

Primary Examiner—C. Melissa Koslow

(57) ABSTRACT

The object of the present invention is to provide an oxide glass capable of exhibiting a long lasting afterglow and photostimulated phosphorescence, whereby energy can be accumulated by radiation excitation, for example, by γ-rays, X-rays, UV-rays, etc. and light emission can be continued for a long time even after stopping the excitation. That is, the present invention relates to an oxide glass capable of exhibiting a long lasting afterglow and photostimulated luminescence, characterized by a constitutional composition comprising, at least, terbium oxide ($Tb_2O_3$) or manganese oxide (MnO), gallium oxide ($Ga_2O_3$) or aluminum oxide ($Al_2O_3$), alkali metal oxide or alkaline earth metal oxide and boron oxide ($B_2O_3$) or silicon oxide ($SiO_2$) or zinc oxide (ZnO).

5 Claims, 3 Drawing Sheets

OXIDE GLASS SHOWING LONG AFTERGLOW AND ACCELERATED PHOSPHORESCENCE

This application is the national phase of international application PCT/JP99/01642 filed Mar. 30, 1999 which designated the U.S.

TECHNICAL FIELD

This invention relates to an oxide glass capable of exhibiting a long lasting afterglow and photostimulated luminescence, whereby energy can be accumulated by radiation excitation, for example, by γ-rays, X-rays, UV-rays, etc., light emission can be continued for a long time even after stopping the excitation, so that the oxide glass can be used as a phosphorescent material for night illumination or night signal, and furthermore, photostimulated luminescence can be exhibited by irradiation of visible rays or infrared rays, which is useful for confirming an infrared laser or controlling an optical axis of a laser beam, so that recording or reproducing of γ-rays, X-rays or UV-rays images can be effected, and which can be used as an optical recording material capable of reading and writing.

BACKGROUND TECHNIQUE

Phosphorescent materials or photostimulated luminescence phosphor using rare earth elements have widely been used up to the present time. As a phosphorescent material, there can practically be used $SrAl_2O_4$:$Eu^{2+}$, $Dy^{3+}$, etc. and as a photostimulated luminescence phosphor, there has already been developed $BaFBr$:$Eu^{2+}$, etc. These are opaque materials only exhibiting superficial phosphorescence, generally obtained by coating a suitable carrier with a powdered phosphorescent material or photostimulated luminescence phosphor.

On the other hand, a glass capable of exhibiting a photostimulated luminescence without coating a photostimulated luminescence phosphor has been disclosed in JP-A-9-221336. In addition, Japanese Patent Application Nos. 346362/1997, 130344/1998 and 187341/1998 respectively disclose obtaining phosphorescent glasses of $SiO_2$—$B_2O_3$—$ZnO$—$Tb_2O_3$ system, $GeO_2$—$ZnO$—$Na_2O$—$Tb_2O_3$ system and $SiO_2$—$ZnO$—$Ga_2O_3$—$Tb_2O_3$ system.

In the case of coating a powdered phosphorescent material or photostimulated luminescent phosphor, dispersion of the coating thickness or peeling-off of the coated surface occurs whereby to cause light and shade of the phosphorescence. Furthermore, in order to increase the emission intensity, it is required to coat a phosphorescent material or photostimulated luminescence phosphor with a larger thickness, but the coating is limited by increase of opaqueness thereof. Since a phosphorescence emitted from a grain boundary in the phosphorescent material or photostimulated luminescence phosphor is scattered, furthermore, no clear image can be obtained.

A photostimulated luminescent glass described in JP-A-9-221336 utilizes $Ce^{3+}$ or $Eu^{2+}$ as an active ion for emission. In order to obtain these active ions, it is necessary to add a reducing agent or to melt in a reducing atmosphere. Furthermore, observation of the emission is difficult because of being UV light or blue light.

The present invention has been made to solve the problems of the prior art, as described above, and aims at providing an oxide glass capable of exhibiting a long lasting afterglow and photostimulated luminescence of green or red emitted light readily observable, which can be melted without using any reducing agent or reducing atmosphere by utilizing Tb or Mn as a phosphorescent or luminescent agent.

DISCLOSURE OF INVENTION

The present invention, developed under this situation, provides:

(1) an oxide glass capable of exhibiting a long lasting afterglow and photostimulated luminescence by excitation with radiation such as γ-rays, X-rays, UV-rays, etc. having a constitutional composition comprising, at least, gallium oxide ($Ga_2O_3$) or aluminum oxide ($Al_2O_3$), alkali metal oxide or alkaline earth metal oxide and boron oxide ($B_2O_3$) or silicon oxide ($SiO_2$) or zinc oxide ($ZnO$) in addition to terbium oxide ($Tb_2O_3$) or manganese oxide ($MnO$) as a phosphorescent agent.

Specifically, the present invention relates to (2) an oxide fluorescent or phosphorescent glass capable of exhibiting a long lasting afterglow and photostimulated luminescence, as described in the above (1), which is represented, in terms of atoms for making up the glass, by the following chemical composition (mol %):

| | | | |
|---|---|---|---|
| $SiO_2$ | 0 to 70 | % | |
| $B_2O_3$ | 0 to 80 | % | ($SiO_2$ + $B_2O_3$ = 10 to 80%) |
| $Tb_2O_3$ | 0 to 10 | % | |
| $MnO$ | 0 to 2 | % | ($Tb_2O_3$ = MnO = 0.01 to 10%) |
| $Al_2O_3$ | 0 to 50 | % | |
| $Ga_2O_3$ | 0 to 60 | % | ($Al_2O_3$ + $Ga_2O_3$ = 5 to 60%) |
| $R_2O$ | 0 to 65 | % | (R: at least one atom selected from Li, Na K and Cs) |
| R'O | 0 to 70 | % | (R': at least one atom selected from Mg, Ca, Sr And Ba) |
| $R_2O$ + R'O | 10 to 70 | % | |
| $ZnO$ | 0 to less than 30 | % | |
| $Yb_2O_3$ | 0 to 10 | % | |
| $GeO_2$ | 0 to 20 | % | |
| $ZrO_2$ | 0 to 5 | % | |
| $Ln_2O_3$ | 0 to 8 | % | (Ln: at least one atom selected from Y, La, Gd, Lu, Sm, Dy, and Tm) and |
| $Sb_2O_3$ | 0 to 1 | %. | |

(3) An oxide fluorescent or phosphorescent glass capable of exhibiting a long lasting afterglow and photostimulated luminescence by excitation with radiation such as γ-rays, X-rays, UV-rays, etc., as described in the above (1), which is represented, in terms of atoms for making up the glass, by the following chemical composition (mol %):

| | | | |
|---|---|---|---|
| $Ga_2O_3$ | 0 to 55 | % | |
| $Al_2O_3$ | 20 to 70 | % | (R': at least one atom selected from Mg, Ca, Sr and Ba |
| $ZnO$ | 2 to 40 | % | |
| $Tb_2O_3$ | 0.01 to 5 | % | |
| $R_2O$ | 0 to 25 | % | (R: at least one atom selected from Li, Na, K and Cs) |
| $SiO_2$ | 0 to 15 | % | |
| $GeO_2$ | 0 to 25 | % | |
| $B_2O_3$ | 0 to 25 | % | |
| $Yb_2O_3$ | 0 to 3 | % | |
| $ZrO_2$ | 0 to 5 | % | |
| $Ln_2O_3$ | 0 to 5 | % | (Ln: at least one atom selected from Y, La, Gd, Lu, Sm, Dy, Tm and Pr) and |
| $Sb_2O_3$ | 0 to 1 | %. | |

According to the above described construction, energy can be accumulated by radiation excitation, for example, by γ-rays, X-rays, UV-rays, etc., light emission can be continued for a long time even after stopping the excitation, and furthermore, photostimulated luminescence can be exhibited by irradiation of visible rays or infrared rays.

BEST EMBODIMENTS FOR CARRYING OUT PRESENT INVENTION

Generally, rare earth ions under excited state tend to emit light in about one second to lose its energy. Thus, it is considered in the oxide glass containing a large amount of zinc, for example, glass of $SiO_2$—$B_2O_3$—$ZnO$—$Tb_2O_3$ type as formerly proposed in Japanese Patent Application No. 346362/1997 that energy is accumulated on the trapping level of zinc ion by a high energy of a radiation such as γ-rays, X-rays or UV-rays and the inventors have obtained the knowledge that the energy on the trapping level is released by stimulus such as by heat, visible rays or infrared rays and removed to terbium ion to exhibit a long lasting afterglow and photostimulated luminescence In the glass system of the present invention, it is also considered that a similar emission mechanism acts. That is, it seems that energy remains on defects of a glass formed by irradiation of a high energy radiation such as UV-rays and the energy is gradually released by stimulus such as by heat or light so that rare earth elements emit light.

The glass system of the present invention includes two systems, i.e. an $SiO_2$—$Ga_2O_3$—$Na_2O$—$Tb_2O_3$ or —MnO system containing a relatively large content Of $SiO_2$ and optionally containing ZnO in a relatively small content and another system containing a relatively small content of $SiO_2$ and further ZnO as an essential component, in any case of which an emission mechanism similar to the above described one acts. In the latter case, in particular, since energy can be stored with a lower energy, longer wavelength light by rendering less the content of $SiO_2$ than the $SiO_2$—$Ga_2O_3$—$Na_2O$—$Tb_2O_3$ system, a long lasting afterglow can be obtained by an ordinary fluorescent lamp or sunlight without using a special exciting light source.

In the above described present inventions, Invention (2) relates to a glass of an ($SiO_2$ and/or $B_2O_3$)—($Ga_2O_3$ and/or $Al_2O_3$)—(R'O and/or $R_2O$)—($Tb_2O_3$ and/or MnO) system, in which $Al_2O_3$ or $Ga_2O_3$ is considered to contribute to the lasting afterglow, while Invention (3) relates to a glass of $Ga_2O_3$ or $Al_2O_3$ having a similar effect. The glass-forming material is $Ga_2O_3$ or $Al_2O_3$, and other glass-forming materials such as $SiO_2$ are not particularly required, but use thereof results in more stable production of the glass. In the glass of the $SiO_2$—$B_2O_3$—$ZnO$—$Tb_2O_3$ system, formerly proposed in Japanese Patent Application No. 346362/1997, the lasting afterglow effect by ZnO is remarkable, whilst in Invention (2), the lasting afterglow probably due to $Ga_2O_3$ or $Al_2O_3$ is found even if ZnO is not contained.

In the present invention, as a radiation, there can be used charged particle rays in addition to γ-rays, X-rays or UV-rays, described above.

The reasons for limiting the composition range of each component of this oxide phosphorescent glass to described above are as follows:

In Invention (2), $SiO_2$ is a main glass-forming oxide, which, however, should be present in a relatively large amount, while in Invention (3), $SiO_2$ is not always required, but it acts as an assistant component for the glass formation. In a glass having a larger $SiO_2$ content, lasting afterglow occurs by high energy irradiation, but in the glass of Invention (3) having a relatively small $SiO_2$ content, lasting afterglow occurs by irradiation of a lower energy, longer wavelength light.

That is to say, in Invention (2), $SiO_2$ is a glass-forming component and when exceeding 70%, the glass melting temperature is too increased to prepare the glass. The preferable range of the $SiO_2$ component is 0 to 60%. In Invention (3), $SiO_2$ is a component for assisting glass-formation, but if the content exceeds 15%, a higher energy, short wavelength light is required to lower the efficiency. The preferred range is at most 10%.

In Invention (2), $B_2O_3$ is a glass-forming component and if the content is more than 80%, the emission intensity is lowered. The preferred range is 0 to 50%. If the sum of the contents of $SiO_2$ and $B_2O_3$ is less than 10% or exceeds 80%, glass formation is difficult. The preferred range of the sum is 10 to 70%.

In Invention (3), on the other hand, $B_2O_3$ is a component for rendering glass formation easy, but if the content exceeds 25%, a higher energy, short wavelength light is required to lower the efficiency. The preferred range is at most 20%.

In Invention (2), $Tb_2O_3$ is a component for presenting green phosphorescence, which should be in a proportion of at most 10%, since if more than 10%, it is difficult to obtain the glass. However, if less than 0.01%, the emission intensity is not sufficient, so it is preferable to adjust the content of $Tb_2O_3$ to 0.01 to 10%. The more preferred range is 0.05 to 8%.

In Invention (2), MnO is a component capable of presenting red phosphorescence, and if more than 2%, it is difficult to obtain the glass. The preferred range is 0 to 1%.

The sum of $Tb_2O_3$ and MnO should be 0.01 to 10%, since if less than 0.01%, the emission intensity is lower, while if more than 10%, it is difficult to obtain the glass. The preferred range is 0.05 to 8%.

In Invention (3), $Tb_2O_3$ is a component for presenting green phosphorescence. If more than 5%, it is difficult to obtain the glass, and if less than 0.01%, the emission intensity is not sufficient. The preferred range is 0.1 to 3%

In Invention (2), $Al_2O_3$ is a component for improving the durability of the glass and giving the afterglow effect thereto. If exceeding 50%, the melting temperature of the glass is too increased to prepare the glass. The preferred range is 0 to 40%.

In Invention (2), $Ga_2O_3$ is a component for improving the lasting afterglow effect of the glass. If more than 60%, the glass is unstable and tends to be crystallized. The preferred range is 0 to 55%.

In Invention (2), if the sum of $Al_2O_3$ and $Ga_2O_3$ is less than 5%, the emission intensity is lowered, while if exceeding 60%, the melting temperature of the glass is too increased to prepare the glass. The preferred range is 5 to 55%.

In Invention (3), on the other hand, $Ga_2O_3$ is a component for forming the glass and improving the lasting afterglow effect of the glass. If more than 55%, the glass is unstable and tends to be crystallized. The preferred range is 0 to 50%.

$Al_2O_3$ is a component for forming the glass and improving the durability of the glass. If exceeding 30%, the melting temperature of the glass is too increased to prepare the glass. The preferred range is 0 to 25%.

If the sum of $Ga_2O_3$ and $Al_2O_3$ is less than 15%, it is difficult to form the glass and the emission intensity of the glass is lowered, while if exceeding 55%, the melting temperature of the glass is too increased to prepare the glass. The preferred range is 18 to 50%.

In Invention (2), the ground for limiting $R_2O+R'O$ will be illustrated below. First, $R_2O$ (R: at least one atom selected from Li, Na, K and Cs) acts to lower the melting temperature of the glass melt, but if exceeding 65%, the water resisting property is lowered and the devitrification tendency is increased, thus rendering the glass unstable. The preferred range is 0 to 60%.

R'O (R': at least one atom selected from Mg, Ca, Sr and Ba) is a component for improving the melting property of the glass. If more than 70%, the glass is unstable and tends to be crystallized. The preferred range of R'O is 0 to 60%.

If the sum of $R_2O+R'O$ is less than 10%, the melting temperature is so high that preparation of the glass is difficult and if more than 70%, the glass is unstable and tends to be crystallized. The preferred range is 10 to 60%.

In Invention (3), on the other hand, R'O (R': at least one atom selected from Mg, Ca, Sr and Ba) is a component for assisting formation of the glass, when used together with $Ga_2O_3$ or $Al_2O_3$. If more than 70%, the glass is unstable and tends to be crystallized, while if less than 20%, the melting temperature of the glass is too increased to prepare the glass. The preferred range is 24 to 65%.

$R_2O$ (R: at least one atom selected from Li, Na, K and Cs) acts to lower the melting temperature of the glass melt, but if exceeding 25%, the water resisting property is lowered and the devitrification tendency is increased, thus rendering the glass unstable. The preferred range is 0 to 20%.

In Invention (2), ZnO is a component for accumulating energy, improving the melting property of the glass and rendering glass formation easy. If more than 30%, glass formation is difficult. The preferred range is 0 to 25%.

In Invention (3), ZnO is similarly a component for accumulating energy, improving the melting property of the glass and rendering glass formation easy. If less than 2%, there arises a problem that the effect of accumulating energy is decreased and the lasting afterglow intensity is lowered, while if more than 40%, glass formation is difficult. The preferred range is 4 to 35%.

In Invention (2), $Yb_2O_3$ acts as a sensitizer to further increase the lasting afterglow effect of the glass, but if more than 10%, the effect thereof is lowered. The preferred range is 0 to 7%. On the other hand, in Invention (3), $Yb_2O_3$ acts as a sensitizer to further increase the lasting afterglow effect of the glass, but if more than 3%, the effect thereof is lowered. The preferred range is 0 to 2%.

In Invention (2), $GeO_2$ is a component for serving to glass formation, but if more than 20%, the glass is unstable and tends to be crystallized. The preferred range is 0 to 15%.

In Invention (3), $GeO_2$ is a component for rendering glass formation easy, but if more than 25%, a high energy short wavelength light is necessary for accumulating energy to deteriorate the property. The preferred range is at most 20%.

In Inventions (2) and (3), $ZrO_2$ is a component for improving the durability of the glass, but if more than 5%, the glass is unstable and tends to be crystallized. The preferred range is 0 to 3.5%.

In Invention (2), $Ln_2O_3$ (Ln: at least one atom selected from Y, La, Gd, Lu, Sm, Dy and Tm) is a component for increasing the viscosity of the glass and suppressing crystallization, but if more than 8%, the above described effect is deteriorated. The preferred range is 0 to 5%.

In Invention (3), on the other hand, $Ln_2O_3$ (Ln: at least one atom selected from Y, La, Gd, Lu, Sm, Dy, Tm and Pr) is also a component for increasing the viscosity of the glass and suppressing crystallization, but if more than 5%, the above described effect is deteriorated. The preferred range is 0 to 3%.

Cleaning agents such as $As_2O_5$ and the commonly used auxiliary components, for example, $P_2O_5$, $WO_3$, $TeO_2$, $Bi_2O_3$, $Nb_2O_5$, $Ta_2O_5$, $TiO_2$, CdO, SnO, PbO, $Tl_2O$, CoO, F, Cl and Br can optionally be added, in such an amount that the effects of the present invention are not deteriorated, to the glass composition.

Production of an oxide phosphorescent glass capable of visually exhibiting a long lasting afterglow and photostimulated luminescence is carried out by mixing the corresponding raw material compounds to a proportion of the object composition, for example, silica, boric anhydride, gallium oxide, calcium oxide, aluminum oxide, zinc oxide, terbium oxide, manganese oxide, etc., melting the resulting mixture at a temperature of 1100 to 1500° C. for 1 to 3 hours and allowing the mixture to flow out in a metallic mold, followed by shaping.

Preferred embodiments of the present invention are summarized below:

(I) Oxide glasses each capable of exhibiting a long lasting afterglow and photostimulated luminescence, as descibed in the foregoing (1), which is represented, in term of atoms for making up the glass, by chemical compositions (mol %) shown in Tables 1 to 3:

TABLE 1

| | |
|---|---|
| $SiO_2$ | 0 to 60 |
| $B_2O_3$ | 0 to 50 |
| $SiO_2 + B_2O_3$ | 10 to 70 |
| $Tb_2O_3$ | 0.05 to 8 |
| $Ga_2O_3$ | 0 to 55 |
| $Al_2O_3$ | 0 to 40 |
| $Ga_2O_3 + Al_2O_3$ | 5 to 55 |
| $R_2O$ ① | 0 to 60 |
| R'O ② | 0 to 60 |
| $R_2O + R'O$ | 10 to 60 |
| ZnO | 0 to 25 |
| $Yb_2O_3$ | 0 to 7 |
| $GeO_2$ | 0 to 15 |
| $ZrO_2$ | 0 to 3.5 |
| $Ln_2O_3$ ③ | 0 to 5 |
| $Sb_2O_3$ | 0 to 0.5 |

(Note)
① R: at least one atom selected from Li, Na, K and Cs
② R': at least one atom selected from Mg, Ca, Sr and Ba
③ Ln: at least one atom selected from Y, La, Gd, Lu, Sm, Dy and Tm

TABLE 2

| | |
|---|---|
| $SiO_2$ | 0 to 60 |
| $B_2O_3$ | 0 to 50 |
| $SiO_2 + B_2O_3$ | 10 to 70 |
| $Tb_2O_3$ | 0 to 8 |
| MnO | 0 to 1 |
| $Tb_2O_3$ + MnO | 0.05 to 8 |
| $Ga_2O_3$ | 0 to 55 |
| $Al_2O_3$ | 0 to 40 |
| $Ga_2O_3 + Al_2O_3$ | 5 to 55 |
| $R_2O$ ① | 0 to 60 |
| R'O ② | 0 to 60 |
| $R_2O$ + R'O | 10 to 60 |
| ZnO | 0 to 25 |
| $Yb_2O_3$ | 0 to 7 |
| $GeO_2$ | 0 to 15 |
| $ZrO_2$ | 0 to 3.5 |
| $Ln_2O_3$ ③ | 0 to 5 |
| $Sb_2O_3$ | 0 to 0.5 |

(Note)
① R: at least one atom selected from Li, Na, K and Cs
② R': at least one atom selected from Mg, Ca, Sr and Ba
③ Ln: at least one atom selected from Y, La, Gd, Lu, Sm, Dy and Tm

TABLE 3

| | |
|---|---|
| $Ga_2O_3$ | 0 to 50 |
| $Al_2O_3$ | 0 to 25 |
| $Ga_2O_3 + Al_2O_3$ | 18 to 50 |
| R'O ① | 24 to 65 |
| ZnO | 4 to 35 |
| $Tb_2O_3$ | 0.1 to 3 |
| $R_2O$ ② | 0 to 20 |
| $SiO_2$ | 0 to 10 |
| $GeO_2$ | 0 to 20 |
| $B_2O_3$ | 0 to 20 |
| $Yb_2O_3$ | 0 to 2 |
| $ZrO_2$ | 0 to 3.5 |
| $Ln_2O_3$ ③ | 0 to 3 |
| $Sb_2O_3$ | 0 to 0.5 |

(Note)
① R': at least one atom selected from Li, Na, K and Cs
② R: at least one atom selected from Mg, Ca, Sr and Ba
③ Ln: at least one atom selected from Y, La, Gd, Lu, Sm, Dy and Tm The present invention will now be illustrated in detail without limiting the same:

EXAMPLE 1

Raw materials were mixed according to weight ratios of Example No. 1 shown in Table 5 to give a composition of Example No. 1 shown in Table 4. The thus prepared raw materials were melted at a temperature of 1100 to 1500° C. for 1 to 3 hours, allowed to flow in a metallic mold and shaped to obtain a glass.

Figure 1:
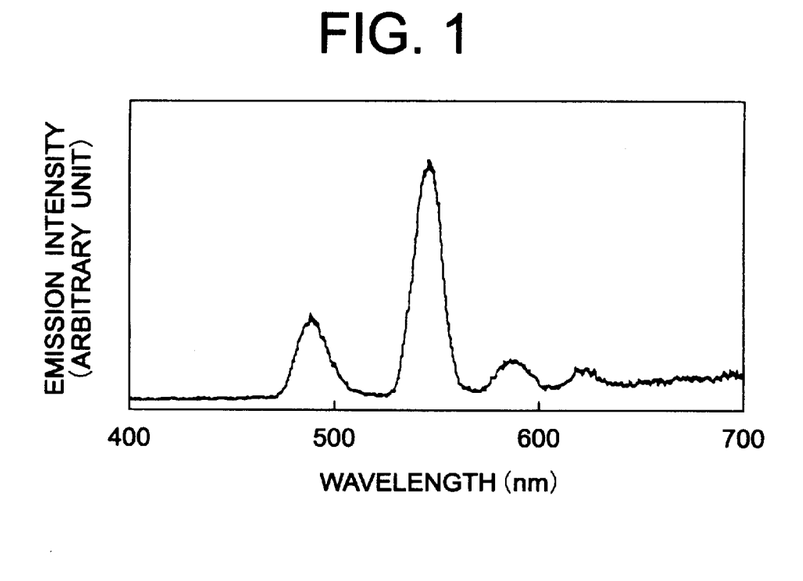
FIG. 1 is a graph showing a phosphorescent spectrum of the glass prepared in Example 1, excited by an UV-ray of 254 nm.
Figure 2:
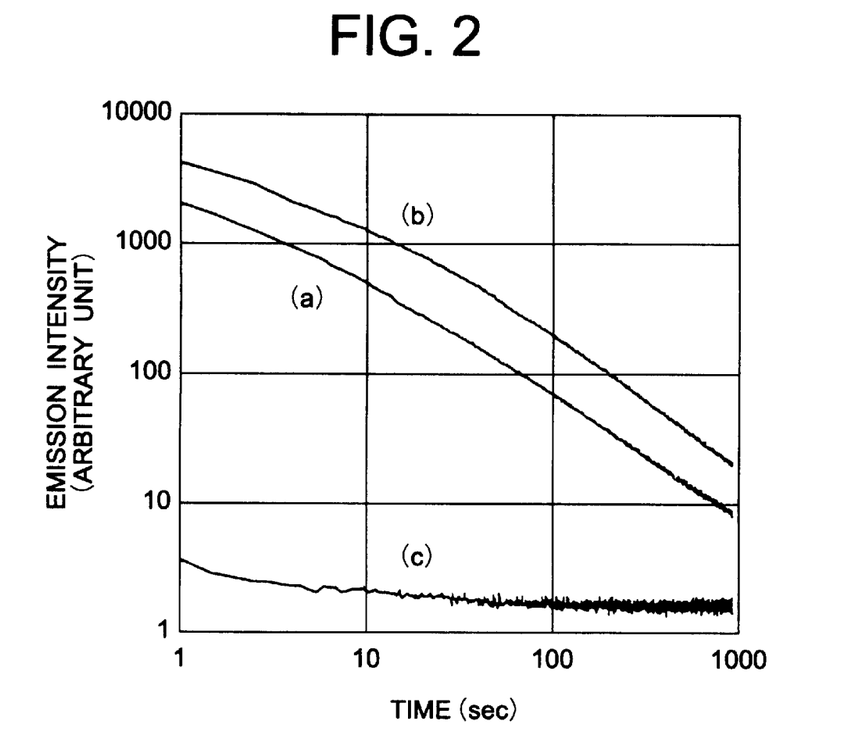
FIG. 2 is a graph, Curves (a), (b) and (c) showing a change of emission intensity with time as to the glasses prepared, respectively in Examples 1, 14 and Comparative Example 1, excited by an UV-ray of 254 nm.

When the resulting glass was excited by an ultraviolet ray of 254 nm, green afterglow phosphorescence was exhibited to give a phosphorescent spectrum shown in FIG. 1. A change of emission intensity with time as to the glass excited by the UV ray of 254 nm is shown in FIG. 2(a). When this glass was irradiated by X-rays and then by a semiconductor laser of 800 nm, a green photostimulated luminescence was visually observed.

EXAMPLES 2 to 29

Raw materials were mixed according to corresponding weight ratios and melted in the similar manner to Example 1 to obtain various glass compositions.

When the resulting glasses in Examples 2 to 29 were excited by an ultraviolet ray of 254 nm, there were obtained similar spectra to FIG. 1 exhibiting afterglow phosphorescence similar to Example 1 and change of emission intensity of thereof with time, similar to FIG. 2. The change in the case of Example 14 is also shown in FIG. 2(b). When these glasses were irradiated by X-rays in the similar manner to Example 1 and then by a semiconductor laser of 800 nm, a green photostimulated luminescence was visually observed.

Comparative Example 1

A glass having a composition shown in Comparative Example 1 of Table 5 was prepared using rtaw materials shown in Comparative Example 1 of Table 4 in the similar manner to Example 1. When the resulting glass was excited by an ultraviolet ray of 254 nm under the similar condition to Example 1, and the afterglow intensity was measured. The result is shown in FIG. 2(c).

TABLE 4

(g)

| | Example No. | | | | | | | | | |
|---|---|---|---|---|---|---|---|---|---|---|
| | 1 | 2 | 3 | 4 | 5 | 6 | 7 | 8 | 9 | 10 |
| $SiO_2$ | 15.64 | 33.98 | 20.93 | 13.83 | 41.22 | 23.88 | 19.14 | 15.49 | 13.34 | 16.09 |
| $B_2O_3$ | | | | | | | | | | |
| $Tb_2O_3$ | 3.17 | 1.03 | 0.73 | 0.61 | 0.84 | 0.97 | 0.78 | 0.63 | 0.54 | 0.65 |
| $Al_2O_3$ | | 28.83 | | | | | | | | |
| $Ga_2O_3$ | 65.05 | | 55.97 | 70.62 | 42.87 | 24.83 | 59.73 | 64.45 | 55.50 | 66.92 |
| $Li_2O$ | | | | | | | 6.34 | | | |
| $Na_2O$ | 16.13 | 35.05 | 21.59 | 14.27 | 14.17 | 49.27 | 13.17 | 10.65 | 9.17 | 13.83 |
| $K_2O$ | | | | | | | | 8.10 | | |
| $Cs_2O$ | | | | | | | | | 20.86 | |
| MgO | | | | | | | | | | 1.80 |
| CaO | | | | | | | | | | |
| SrO | | | | | | | | | | |
| BaO | | | | | | | | | | |
| ZnO | | | | | | | | | | |
| $Yb_2O_3$ | | 1.11 | 0.78 | 0.66 | 0.90 | 1.04 | 0.84 | 0.68 | 0.58 | 0.70 |
| $GeO_2$ | | | | | | | | | | |
| $ZrO_2$ | | | | | | | | | | |
| $La_2O_3$ | | | | | | | | | | |
| $Dy_2O_3$ | | | | | | | | | | |
| $Y_2O_3$ | | | | | | | | | | |

TABLE 4-continued (g)

| | Example No. | | | | | | | | | |
|---|---|---|---|---|---|---|---|---|---|---|
| | 11 | 12 | 13 | 14 | 15 | 16 | 17 | 18 | 19 | 20 |
| $SiO_2$ | 16.02 | 15.37 | 14.74 | | | | | | | |
| $B_2O_3$ | | | | 17.68 | 17.19 | 18.01 | 5.22 | 22.98 | 33.17 | 11.89 |
| $Tb_2O_3$ | 0.65 | 0.62 | 0.60 | 3.10 | 0.90 | 0.63 | 0.55 | 0.81 | 0.70 | 0.62 |
| $Al_2O_3$ | | | | | 50.34 | | | | | |
| $Ga_2O_3$ | 66.63 | 63.93 | 61.33 | 63.48 | | 64.65 | 77.36 | 41.25 | 53.58 | 64.00 |
| $Li_2O$ | | | | | | | | | | |
| $Na_2O$ | 11.02 | 10.57 | 10.14 | 15.74 | 30.60 | 16.03 | 16.28 | 34.10 | 11.81 | 15.87 |
| $K_2O$ | | | | | | | | | | |
| $Cs_2O$ | | | | | | | | | | |
| MgO | | | | | | | | | | |
| CaO | 4.98 | | | | | | | | | |
| SrO | | 8.84 | | | | | | | | |
| BaO | | | 12.54 | | | | | | | |
| ZnO | | | | | | | | | | 6.95 |
| $Yb_2O_3$ | 0.70 | 0.67 | 0.65 | | 0.97 | 0.68 | 0.59 | 0.87 | 0.75 | 0.67 |
| $GeO_2$ | | | | | | | | | | |
| $ZrO_2$ | | | | | | | | | | |
| $La_2O_3$ | | | | | | | | | | |
| $Dy_2O_3$ | | | | | | | | | | |
| $Y_2O_3$ | | | | | | | | | | |

(g)

| | Example No. | | | | | | | | | Com. Ex. |
|---|---|---|---|---|---|---|---|---|---|---|
| | 21 | 22 | 23 | 24 | 25 | 26 | 27 | 28 | 29 | 1 |
| $SiO_2$ | 6.02 | 5.34 | | 15.76 | 15.95 | 15.94 | 15.98 | | | 27.48 |
| $B_2O_3$ | 13.95 | 12.37 | 12.34 | | | | | 20.66 | 16.08 | 42.46 |
| $Tb_2O_3$ | 0.73 | 0.65 | 0.65 | 0.64 | 0.65 | 0.65 | 0.65 | 0.72 | 0.85 | 1.12 |
| $Al_2O_3$ | 10.22 | | | | | | | | | |
| $Ga_2O_3$ | 46.95 | 58.31 | 58.16 | 65.57 | 66.36 | 66.31 | 66.48 | 55.64 | 43.30 | |
| $Li_2O$ | | | | | | | | | | |
| $Na_2O$ | 21.73 | 13.77 | 19.23 | 15.18 | 16.46 | 16.44 | 16.49 | | | 28.35 |
| $K_2O$ | | | | | | | | | | |
| $Cs_2O$ | | | | | | | | | | |
| MgO | | | | | | | | | | |
| CaO | | | | | | | | 22.19 | 38.86 | |
| SrO | | 9.21 | | | | | | | | |
| BaO | | | | | | | | | | |
| ZnO | | | | | | | | | | |
| $Yb_2O_3$ | 0.39 | 0.35 | 0.35 | 0.69 | | | | 0.78 | 0.91 | 0.60 |
| $GeO_2$ | | | 9.27 | | | | | | | |
| $ZrO_2$ | | | | 2.16 | | | | | | |
| $La_2O_3$ | | | | | 0.58 | | | | | |
| $Dy_2O_3$ | | | | | | 0.66 | | | | |
| $Y_2O_3$ | | | | | | | 0.40 | | | |

TABLE 5

(mol %)

| | Example No. | | | | | | | | | |
|---|---|---|---|---|---|---|---|---|---|---|
| | 1 | 2 | 3 | 4 | 5 | 6 | 7 | 8 | 9 | 10 |
| $SiO_2$ | 29.71 | 39.84 | 34.86 | 27.39 | 59.76 | 29.88 | 29.88 | 29.88 | 29.88 | 29.88 |
| $B_2O_3$ | | | | | | | | | | |
| $Tb_2O_3$ | 0.99 | 0.20 | 0.20 | 0.20 | 0.20 | 0.20 | 0.20 | 0.20 | 0.20 | 0.20 |
| $Al_2O_3$ | | 19.92 | | | | | | | | |
| $Ga_2O_3$ | 39.60 | | 29.88 | 44.82 | 19.92 | 9.96 | 29.89 | 39.85 | 39.85 | 39.84 |
| $Li_2O$ | | | | | | | 19.90 | | | |
| $Na_2O$ | 29.70 | 39.84 | 34.86 | 27.39 | 19.92 | 59.76 | 19.93 | 19.91 | 19.91 | 24.90 |
| $K_2O$ | | | | | | | | 9.97 | | |
| $Cs_2O$ | | | | | | | | | 9.96 | |
| MgO | | | | | | | | | | 4.98 |
| CaO | | | | | | | | | | |
| SrO | | | | | | | | | | |
| BaO | | | | | | | | | | |
| ZnO | | | | | | | | | | |

TABLE 5-continued

| | | | | | | | | | |
|---|---|---|---|---|---|---|---|---|---|
| Yb$_2$O$_3$ | 0.20 | 0.20 | 0.20 | 0.20 | 0.20 | 0.20 | 0.20 | 0.20 | 0.20 |
| GeO$_2$ | | | | | | | | | |
| ZrO$_2$ | | | | | | | | | |
| La$_2$O$_3$ | | | | | | | | | |
| Dy$_2$O$_3$ | | | | | | | | | |
| Y$_2$O$_3$ | | | | | | | | | |

(mol %)

| | Example No. | | | | | | | | | |
|---|---|---|---|---|---|---|---|---|---|---|
| | 11 | 12 | 13 | 14 | 15 | 16 | 17 | 18 | 19 | 20 |
| SiO$_2$ | 29.88 | 29.88 | 29.87 | | | | | | | |
| B$_2$O$_3$ | | | | 29.70 | 19.92 | 29.88 | 9.95 | 29.88 | 49.80 | 19.93 |
| Tb$_2$O$_3$ | 0.20 | 0.20 | 0.20 | 0.99 | 0.20 | 0.20 | 0.20 | 0.20 | 0.20 | 0.20 |
| Al$_2$O$_3$ | | | | | 39.84 | | | | | |
| Ga$_2$O$_3$ | 39.84 | 39.84 | 39.84 | 39.60 | | 39.84 | 54.78 | 19.92 | 29.88 | 39.84 |
| Li$_2$O | | | | | | | | | | |
| Na$_2$O | 19.93 | 19.92 | 19.92 | 29.70 | 39.84 | 29.88 | 34.87 | 49.80 | 19.92 | 29.88 |
| K$_2$O | | | | | | | | | | |
| Cs$_2$O | | | | | | | | | | |
| MgO | | | | | | | | | | |
| CaO | 9.95 | | | | | | | | | |
| SrO | | 9.97 | | | | | | | | |
| BaO | | | 9.96 | | | | | | | |
| ZnO | | | | | | | | | | 9.96 |
| Yb$_2$O$_3$ | 0.20 | 0.20 | 0.20 | | 0.20 | 0.20 | 0.20 | 0.20 | 0.20 | 0.20 |
| GeO$_2$ | | | | | | | | | | |
| ZrO$_2$ | | | | | | | | | | |
| La$_2$O$_3$ | | | | | | | | | | |
| Dy$_2$O$_3$ | | | | | | | | | | |
| Y$_2$O$_3$ | | | | | | | | | | |

(mol %)

| | Example No. | | | | | | | | | Com. Ex. |
|---|---|---|---|---|---|---|---|---|---|---|
| | 21 | 22 | 23 | 24 | 25 | 26 | 27 | 28 | 29 | 1 |
| SiO$_2$ | 9.97 | 9.97 | | 29.87 | 29.87 | 29.88 | 29.88 | | | 29.91 |
| B$_2$O$_3$ | 19.94 | 19.93 | 19.94 | | | | | 29.88 | 19.92 | 39.88 |
| Tb$_2$O$_3$ | 0.20 | 0.20 | 0.20 | 0.20 | 0.20 | 0.20 | 0.20 | 0.20 | 0.20 | 0.20 |
| Al$_2$O$_3$ | 9.97 | | | | | | | | | |
| Ga$_2$O$_3$ | 24.93 | 34.90 | 34.90 | 34.84 | 39.84 | 39.84 | 39.84 | 29.89 | 19.92 | |
| Li$_2$O | | | | | | | | | | |
| Na$_2$O | 34.89 | 24.93 | 34.90 | 27.89 | 29.89 | 29.88 | 29.89 | | | 29.91 |
| K$_2$O | | | | | | | | | | |
| Cs$_2$O | | | | | | | | | | |
| MgO | | | | | | | | | | |
| CaO | | | | | | | | 39.84 | 59.76 | |
| SrO | | 9.97 | | | | | | | | |
| BaO | | | | | | | | | | |
| ZnO | | | | | | | | | | |
| Yb$_2$O$_3$ | 0.10 | 0.10 | 0.10 | 0.20 | | | | 0.20 | 0.20 | 0.10 |
| GeO$_2$ | | | 9.96 | | | | | | | |
| ZrO$_2$ | | | | 2.00 | | | | | | |
| La$_2$O$_3$ | | | | | 0.20 | | | | | |
| Dy$_2$O$_3$ | | | | | | 0.20 | | | | |
| Y$_2$O$_3$ | | | | | | | 0.20 | | | |

EXAMPLE 30

Raw materials were mixed according to weight ratios of Example No. 30 shown in Table 6 to give a composition of Example No. 30 shown in Table 7. The thus prepared raw materials were melted at a temperature of 1100 to 1500° C. for 1 to 3 hours, allowed to flow in a metallic mold and shaped to obtain a glass.

Figure 3:
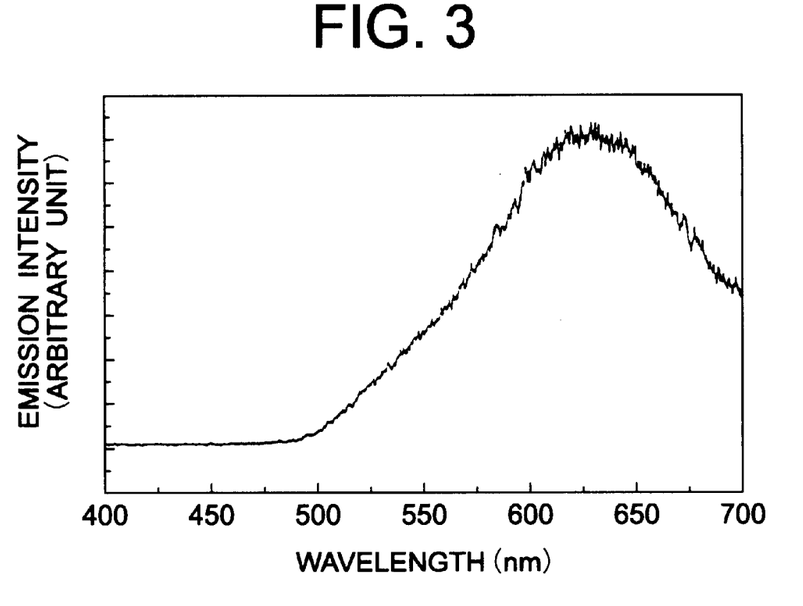
FIG. 3 is a graph showing a phosphorescent spectrum of the glass prepared in Example 30, excited by an UV-ray of 254 nm.
Figure 4:
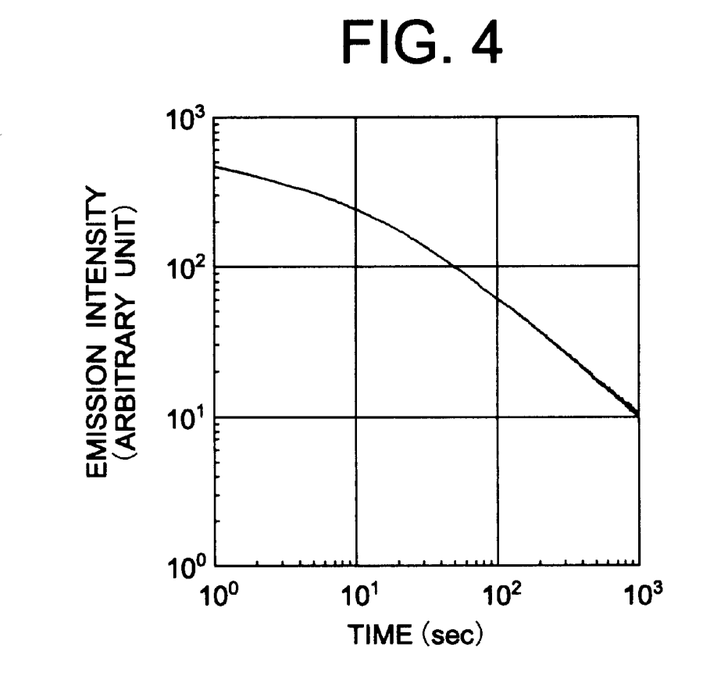
FIG. 4 is a graph showing a change of emission intensity with time as to the glass prepared in Example 30, excited by an UV-ray of 254 nm.

When the resulting glass was excited by an ultraviolet ray of 254 nm, red afterglow phosphorescence was exhibited to give a phosphorescent spectrum shown in FIG. 3. A change of emission intensity with time as to the glass excited by the UV ray of 254 nm is shown in FIG. 4. When this glass was irradiated by X-rays and then by a semiconductor laser of 800 nm, a red photostimulated luminescence was visually observed.

EXAMPLES 31 to 35

Raw materials were mixed according to corresponding weight ratios and melted in the similar manner to Example 30 to obtain various glasses.

When the resulting glasses in Examples 31, 34 and 35 were excited by an ultraviolet ray of 254 nm, there were obtained similar phosphorescent spectra to FIG. 3 exhibiting red afterglow phosphorescence similar to Example 30 and change of emission intensity of thereof with time, similar to FIG. 4. When these glasses were irradiated by X-rays in the similar manner to Example 30 and then by a semiconductor laser of 800 nm, a red photostimulated luminescence was visually observed.

When glasses obtained in Examples 32 and 33 by mixing both of MnO and Tb$_2$O$_3$ were irradiated by an ultraviolet ray of 254 nm, on the other hand, two peaks of FIG. 1 and FIG. 3 were simultaneously observed in phosphorescent spectra exhibiting orange afterglow phosphorescence. After irradiating an ultraviolet ray of 254 nm, there was obtained change of emission intensity of each peak with time, similar to FIG. 2(*a*) or FIG. 4.

TABLE 6

| | (g) | | | | | |
|---|---|---|---|---|---|---|
| Example No. | 30 | 31 | 32 | 33 | 34 | 35 |
| $SiO_2$ | 16.12 | 16.23 | 16.17 | 16.12 | | |
| $B_2O_3$ | | | | | 20.45 | 22.32 |
| $Ga_2O_3$ | 67.06 | 67.50 | 67.28 | 67.04 | 55.06 | 40.06 |
| $Al_2O_3$ | | | | | | 10.90 |
| CaO | | 5.05 | 5.03 | 5.01 | | |
| $Na_2O$ | 16.63 | 11.16 | 11.12 | 11.08 | 24.28 | 26.49 |
| MnO | 0.063 | 0.064 | 0.064 | 0.063 | 0.069 | 0.076 |
| $Tb_2O_3$ | | | 0.33 | 0.33 | | |
| $Yb_2O_3$ | | | | 0.35 | | |
| $Sb_2O_3$ | 0.13 | | | | 0.14 | 0.16 |

TABLE 7

| | (mol %) | | | | | |
|---|---|---|---|---|---|---|
| Example No. | 30 | 31 | 32 | 33 | 34 | 35 |
| $SiO_2$ | 29.96 | 29.97 | 29.94 | 29.91 | | |
| $B_2O_3$ | | | | | 29.96 | 29.96 |
| $Ga_2O_3$ | 39.94 | 39.96 | 39.92 | 39.88 | 29.96 | 19.97 |
| $Al_2O_3$ | | | | | | 9.98 |
| CaO | | 9.99 | 9.98 | 9.97 | | |
| $Na_2O$ | 29.96 | 19.98 | 19.96 | 19.94 | 39.94 | 39.94 |
| MnO | 0.10 | 0.10 | 0.10 | 0.10 | 0.10 | 0.10 |
| $Tb_2O_3$ | | | 0.10 | 0.10 | | |
| $Yb_2O_3$ | | | | 0.10 | | |
| $Sb_2O_3$ | 0.05 | | | | 0.05 | 0.05 |

EXAMPLE 36

Raw materials were mixed according to weight ratios of Example No. 36 shown in Table 8 to give a composition of Example No. 36 shown in Table 9. The thus prepared raw materials were melted at a temperature of 1100 to 1500° C. for 1 to 3 hours, allowed to flow in a metallic mold and shaped to obtain a glass.

Figure 5:
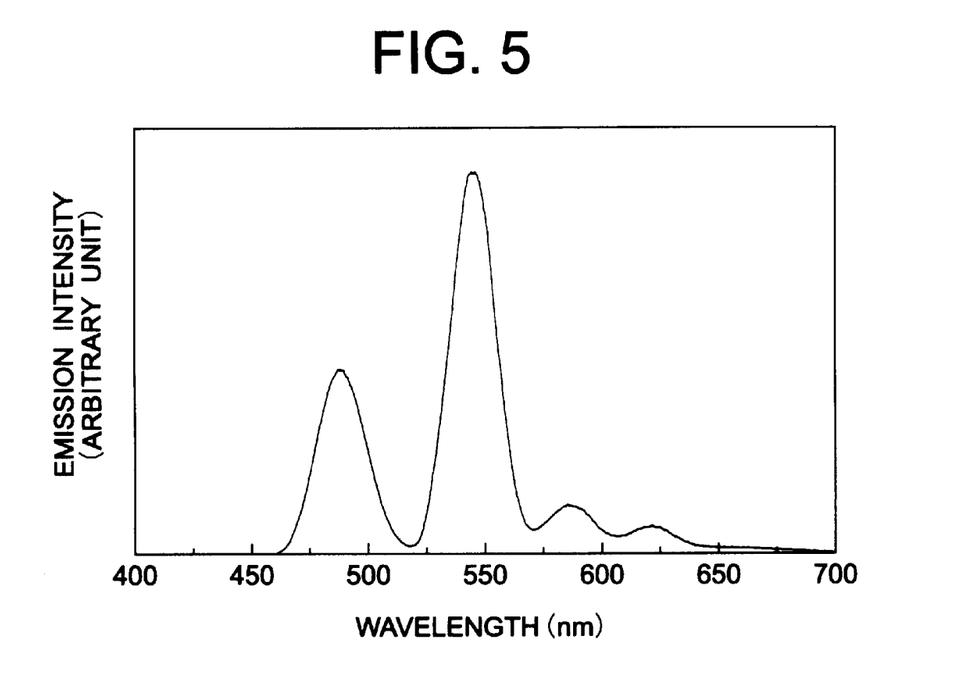
FIG. 5 is a graph showing a phosphorescent spectrum of the glass prepared in Example 36, excited by an UV-ray of 330 nm.
Figure 6:
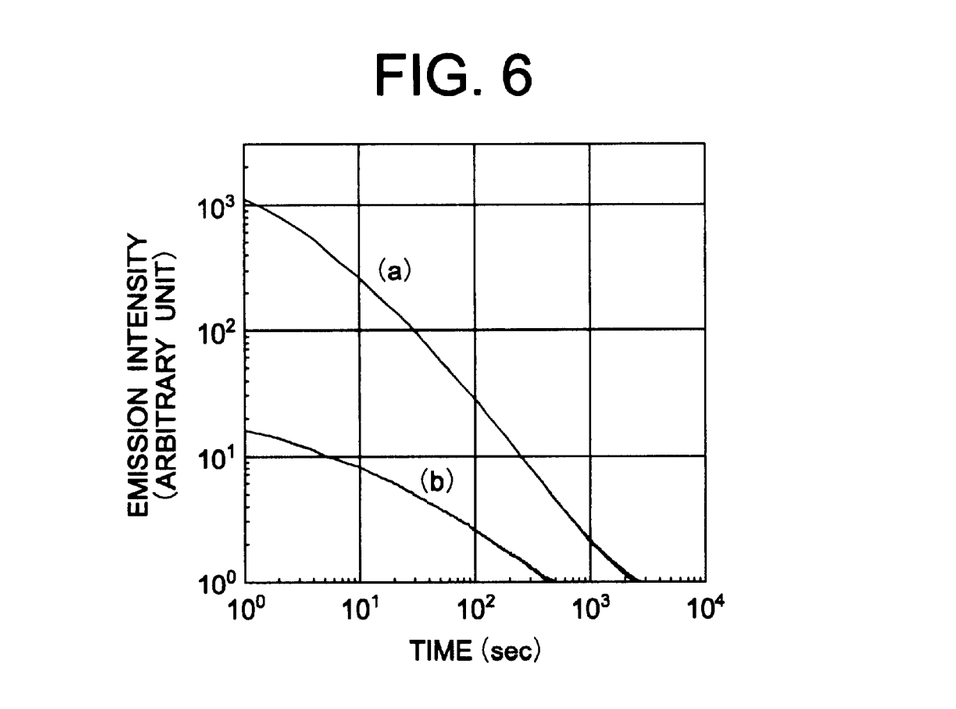
FIG. 6 is a graph, Curves (a) and (b) showing a change of emission intensity with time as to the glasses prepared, respectively in Example 36 and Comparative Example 2, excited by an UV-ray of 330 nm.

When the resulting glass was excited by an ultraviolet ray of 330 nm, a green afterglow phosphorescence was exhibited to give a phosphorescent spectrum shown in FIG. 5. A change of emission intensity with time as to the glass excited by the UV ray of 330 nm is shown in FIG. 6(*a*). When this glass was irradiated by X-rays and then by a semiconductor laser of 800 nm or 980 nm, a green photostimulated luminescence was visually observed.

EXAMPLES 37 to 56

Raw materials were mixed according to corresponding weight ratios and melted in the similar manner to Example 36 to obtain various glasses.

When the resulting glasses in Examples 37 to 56 were excited by an ultraviolet ray of 330 nm, there were obtained similar phosphorescent spectra to FIG. 5 exhibiting the afterglow phosphorescence similar to Example 36, and change of emission intensity of thereof with time, similar to FIG. 6(*a*). When these glasses were irradiated by X-rays in the similar manner to Example 1 and then by a semiconductor laser of 800 nm, a green photostimulated luminescence was visually observed.

Comparative Example 2

A glass having a composition shown in Comparative Example 2 of Table 9 was prepared in the similar manner to Example 36. When the resulting glass was excited by an ultraviolet ray of 330 nm under the similar condition to Example 36, afterglow phosphorescence was hardly measured and change of emission intensity of thereof with time is shown FIG. 6(*b*).

TABLE 8

| | | | | | | Example No. | | | | | | (g) |
|---|---|---|---|---|---|---|---|---|---|---|---|---|
| | 36 | 37 | 38 | 39 | 40 | 41 | 42 | 43 | 44 | 45 | 46 | |
| $Ga_2O_3$ | 55.65 | 11.37 | 73.61 | 69.50 | 42.78 | 66.05 | 46.93 | 55.16 | 59.67 | | 61.81 | |
| $Al_2O_3$ | | 24.73 | | | | | | | | 33.47 | | |
| CaO | 27.75 | 23.80 | 13.21 | 11.55 | 41.60 | 17.29 | 16.85 | 19.25 | 20.40 | 25.78 | 23.78 | |
| ZnO | 8.05 | 29.61 | 6.39 | 6.71 | 9.29 | 3.58 | 24.45 | 7.98 | 14.80 | 21.38 | 7.67 | |
| $Tb_2O_3$ | 1.45 | 1.77 | 1.15 | 1.21 | 1.67 | 1.29 | 1.47 | 1.44 | 1.33 | 1.92 | 0.34 | |
| $Yb_2O_3$ | 0.78 | 0.96 | 0.62 | 0.65 | 0.90 | 0.69 | 0.79 | 0.77 | 0.72 | 1.04 | 0.37 | |
| $Na_2O$ | 3.07 | 3.76 | 2.43 | 7.66 | | 8.19 | 6.21 | 12.16 | 2.82 | 8.14 | 2.92 | |
| $SiO_2$ | 2.97 | 3.64 | 2.36 | 2.48 | 3.43 | 2.65 | 3.01 | 2.95 | | 7.89 | 2.83 | |
| $GeO_2$ | | | | | | | | | | | | |
| $B_2O_3$ | | | | | | | | | | | | |
| $Sb_2O_3$ | 0.29 | 0.10 | 0.23 | 0.24 | 0.33 | 0.26 | 0.29 | 0.29 | 0.27 | 0.38 | 0.27 | |
| $Li_2O$ | | | | | | | | | | | | |
| $K_2O$ | | | | | | | | | | | | |
| MgO | | | | | | | | | | | | |
| SrO | | | | | | | | | | | | |
| BaO | | | | | | | | | | | | |
| $Dy_2O_3$ | | | | | | | | | | | | |
| $La_2O_3$ | | | | | | | | | | | | |

TABLE 8-continued

|  | Example No. |  |  |  |  |  |  |  |  |  | (g) Com. No. |
|---|---|---|---|---|---|---|---|---|---|---|---|
|  | 47 | 48 | 49 | 50 | 51 | 52 | 53 | 54 | 55 | 56 | 2 |
| $Ga_2O_3$ | 54.03 | 55.01 | 61.41 | 51.68 | 51.81 | 30.72 | 56.26 | 50.24 | 55.87 | 48.10 | 66.23 |
| $Al_2O_3$ |  |  |  |  |  | 16.71 |  |  |  |  |  |
| CaO | 18.47 | 27.43 | 23.62 |  | 15.50 | 21.44 | 25.25 | 8.59 | 27.86 | 26.65 | 4.95 |
| ZnO | 6.70 | 7.96 | 7.62 | 6.41 | 14.99 | 17.78 | 8.14 | 6.23 | 8.09 | 7.74 |  |
| $Tb_2O_3$ | 9.04 | 1.43 | 1.37 | 1.15 | 1.35 | 1.60 | 1.46 | 1.12 | 1.45 | 1.39 | 1.94 |
| $Yb_2O_3$ | 6.49 | 0.77 |  | 0.62 | 0.73 | 0.86 | 0.79 | 0.60 |  | 0.75 |  |
| $Na_2O$ | 2.55 | 3.03 | 2.90 | 4.88 | 5.71 | 6.77 | 2.48 |  | 3.08 | 2.95 | 10.95 |
| $SiO_2$ | 2.47 | 2.94 | 2.81 | 2.37 |  |  | 3.01 | 2.30 | 2.96 | 2.86 | 15.92 |
| $GeO_2$ |  |  |  |  | 9.64 |  |  |  |  |  |  |
| $B_2O_3$ |  |  |  |  |  | 3.80 |  |  |  |  |  |
| $Sb_2O_3$ | 0.24 | 1.43 | 0.27 | 0.23 | 0.27 | 0.32 | 0.29 | 0.22 | 0.29 | 0.28 |  |
| $Li_2O$ |  |  |  |  |  |  | 0.30 |  |  |  |  |
| $K_2O$ |  |  |  |  |  |  |  | 7.21 |  |  |  |
| MgO |  |  |  |  |  |  | 2.02 |  |  |  |  |
| SrO |  |  |  | 32.65 |  |  |  |  |  |  |  |
| BaO |  |  |  |  |  |  |  | 23.48 |  |  |  |
| $Dy_2O_3$ |  |  |  |  |  |  |  |  | 0.37 |  |  |
| $La_2O_3$ |  |  |  |  |  |  |  |  |  | 9.29 |  |

TABLE 9

|  | Example No. |  |  |  |  |  |  |  |  |  | (mol %) |
|---|---|---|---|---|---|---|---|---|---|---|---|
|  | 36 | 37 | 38 | 39 | 40 | 41 | 42 | 43 | 44 | 45 | 46 |
| $Ga_2O_3$ | 29.79 | 4.97 | 49.65 | 44.69 | 19.86 | 39.72 | 24.83 | 29.79 | 34.76 |  | 34.90 |
| $Al_2O_3$ |  | 19.86 |  |  |  |  |  |  |  | 24.83 |  |
| CaO | 49.65 | 34.76 | 29.79 | 24.83 | 64.55 | 34.76 | 29.79 | 34.76 | 39.72 | 34.76 | 44.87 |
| ZnO | 9.93 | 29.79 | 9.93 | 9.93 | 9.93 | 4.97 | 29.79 | 9.93 | 19.86 | 19.86 | 9.97 |
| $Tb_2O_3$ | 0.40 | 0.40 | 0.40 | 0.40 | 0.40 | 0.40 | 0.40 | 0.40 | 0.40 | 0.40 | 0.10 |
| $Yb_2O_3$ | 0.20 | 0.20 | 0.20 | 0.20 | 0.20 | 0.20 | 0.20 | 0.20 | 0.20 | 0.20 | 0.10 |
| $Na_2O$ | 4.97 | 4.97 | 4.97 | 14.90 |  | 14.90 | 9.93 | 19.86 | 4.97 | 9.93 | 4.99 |
| $SiO_2$ | 4.97 | 4.97 | 4.97 | 4.97 | 4.97 | 4.97 | 4.97 | 4.97 |  | 9.93 | 4.99 |
| $GeO_2$ |  |  |  |  |  |  |  |  |  |  |  |
| $B_2O_3$ |  |  |  |  |  |  |  |  |  |  |  |
| $Sb_2O_3$ | 0.10 | 0.10 | 0.10 | 0.10 | 0.10 | 0.10 | 0.10 | 0.10 | 0.10 | 0.10 | 0.10 |
| $Li_2O$ |  |  |  |  |  |  |  |  |  |  |  |
| $K_2O$ |  |  |  |  |  |  |  |  |  |  |  |
| MgO |  |  |  |  |  |  |  |  |  |  |  |
| SrO |  |  |  |  |  |  |  |  |  |  |  |
| BaO |  |  |  |  |  |  |  |  |  |  |  |
| $Dy_2O_3$ |  |  |  |  |  |  |  |  |  |  |  |
| $La_2O_3$ |  |  |  |  |  |  |  |  |  |  |  |

|  | Example No. |  |  |  |  |  |  |  |  |  | (mol %) Com. No. |
|---|---|---|---|---|---|---|---|---|---|---|---|
|  | 47 | 48 | 49 | 50 | 51 | 52 | 53 | 54 | 55 | 56 | 2 |
| $Ga_2O_3$ | 34.97 | 29.67 | 34.83 | 34.76 | 29.79 | 14.90 | 29.79 | 34.76 | 29.82 | 26.81 | 39.76 |
| $Al_2O_3$ |  |  |  |  |  | 14.90 |  |  |  |  |  |
| CaO | 39.96 | 49.46 | 44.78 |  | 29.79 | 34.76 | 44.69 | 19.86 | 49.70 | 49.65 | 9.94 |
| ZnO | 9.99 | 9.89 | 9.95 | 9.93 | 19.86 | 19.86 | 9.93 | 9.93 | 9.94 | 9.93 |  |
| $Tb_2O_3$ | 3.00 | 0.40 | 0.40 | 0.40 | 0.40 | 0.40 | 0.40 | 0.40 | 0.40 | 0.40 | 0.60 |
| $Yb_2O_3$ | 2.00 | 0.20 |  | 0.20 | 0.20 | 0.20 | 0.20 | 0.20 |  | 0.20 |  |
| $Na_2O$ | 5.00 | 4.94 | 4.98 | 9.93 | 9.93 | 9.93 | 3.97 |  | 4.97 | 4.97 | 19.88 |
| $SiO_2$ | 5.00 | 4.94 | 4.98 | 4.97 |  |  | 4.97 | 4.96 | 4.97 | 4.97 | 29.82 |
| $GeO_2$ |  |  |  |  | 9.93 |  |  |  |  |  |  |
| $B_2O_3$ |  |  |  |  |  | 4.96 |  |  |  |  |  |
| $Sb_2O_3$ | 0.10 | 0.49 | 0.10 | 0.10 | 0.10 | 0.10 | 0.10 | 0.10 | 0.10 | 0.10 |  |
| $Li_2O$ |  |  |  |  |  |  | 0.99 |  |  |  |  |
| $K_2O$ |  |  |  |  |  |  |  | 9.93 |  |  |  |
| MgO |  |  |  |  |  |  | 4.97 |  |  |  |  |
| SrO |  |  |  | 39.72 |  |  |  |  |  |  |  |
| BaO |  |  |  |  |  |  |  | 19.86 |  |  |  |
| $Dy_2O_3$ |  |  |  |  |  |  |  |  | 0.10 |  |  |
| $La_2O_3$ |  |  |  |  |  |  |  |  |  | 2.98 |  |

Utility and Possibilty on Commercial Scale

According to the present invention, there can be provided an oxide glass capable of exhibiting a long lasting afterglow and photostimulated luminescence, whereby energy can be accumulated by radiation excitation, for example, by γ-rays, X-rays, UV-rays, etc., light emission can be continued for a long time even after stopping the excitation and photostimulated luminescence can be exhibited by irradiation of visible rays or infrared rays. That is, the long lasting afterglow and photostimulated luminescence oxide glass of the present invention can be used not only as a phosphorescent material for night illumination or night signal, but also as a material for confirming an infrared laser or controlling an optical axis because of exhibiting photostimulated luminescence by irradiation of infrared rays. When this glass is converted into fibers, an emitted light in the fiber can efficiently be guided to the end surface of the fiber. In addition, this glass is useful for recording or reproducing of γ-rays, X-rays or UV-rays images without coating the photostimulated luminescent material.

What is claimed is:

1. An oxide glass capable of exhibiting a long lasting afterglow and photostimulated luminescence by excitation with radiation, having a constitutional composition comprising, at least, (i) terbium oxide ($Tb_2O_3$) and/or manganese oxide (MnO), (ii) gallium oxide ($Ga_2O_3$) and optionally aluminum oxide ($Al_2O_3$), (iii) alkali metal oxide and/or alkaline earth metal oxide and (iv) boron oxide ($B_2O_3$) and/or silicon oxide ($SiO_2$) or zinc oxide (ZnO).

2. The oxide glass capable of exhibiting a long lasting afterglow and photostimulated luminescence, as claimed in claim 1, which is represented, in terms of atoms for making up the glass, by the following chemical composition (mol %):

| | |
|---|---|
| $SiO_2$ | 0 to 70% |
| $B_2O_3$ | 0 to 80% ($SiO_2$ + $B_2O_3$ = 10 to 80%) |
| $Tb_2O_3$ | 0 to 10% |
| MnO | 0 to 2% ($Tb_2O_3$ + MnO = 0.01 to 10%) |
| $Al_2O_3$ | 0 to 50% |
| $Ga_2O_3$ | 4 to 60% ($Al_2O_3$ + $Ga_2O_3$ = 5 to 60%) |
| $R_2O$ | 0 to 65% (R: at least one atom selected from Li, Na, K and Cs) |
| R'O | 0 to 70% (R': at least one atom selected from Mg, Ca, Sr, and Ba) ($R_2O$ + R'O 10 to 70%) |
| ZnO | 0 to less than 30% |
| $Yb_2O_3$ | 0 to 10% |
| $GeO_2$ | 0 to 20% |
| $ZrO_2$ | 0 to 5% |
| $Ln_2O_3$ | 0 to 8% (Ln: at least one atom selected from Y, La, Gd, Lu, Sm, Dy, and Tm) and |
| $Sb_2O_3$ | 0 to 1%. |

3. The oxide glass capable of exhibiting a long lasting, afterglow and photostimulated luminescence, as claimed in claim 1, which is represented, in terms of atoms for making up the glass, by the following chemical composition (mol %):

| | |
|---|---|
| $Ga_2O_3$ | 4 to 55% |
| $Al_2O_3$ | 0 to 30% ($Ga_2O_3$ + $Al_2O_3$ = 15 to 55%) |
| R'O | 20 to 70% (R': at least one atom selected from Mg, Ca, Sr, and Ba) |
| ZnO | 2 to 40% |
| $Tb_2O_3$ | 0.01 to 5% |
| $R_2O$ | 0 to 25% (R: at least one atom selected from Li, Na, K, and Cs) |
| $SiO_2$ | 0 to 15% |
| $GeO_2$ | 0 to 25% |
| $B_2O_3$ | 0 to 25% |
| $Yb_2O_3$ | 0 to 3% |
| $ZrO_2$ | 0 to 5% |
| $Ln_2O_3$ | 0 to 5% (Ln: at least one atom selected from Y, La, Gd, Lu, Sm, Dy, Tm and Pr) and |
| $Sb_2O_3$ | 0 to 1%. |

4. The oxide glass capable of exhibiting a long lasting afterglow and photostimulated luminescence, as claimed in claim 2, which is represented, in terms of atoms for making up the glass, by the following chemical composition (mol %):

| | |
|---|---|
| $SiO_2$ | 0 to 60% |
| $B_2O_3$ | 0 to 50% ($SiO_2$ + $B_2O_3$ = 10 to 70%) |
| $Tb_2O_3$ | 0 to 8% |
| MnO | 0 to 1% ($Tb_2O_3$ + MnO = 0.05 to 8%) |
| $Al_2O_3$ | 0 to 40% |
| $Ga_2O_3$ | 4 to 55% ($Al_2O_3$ + $Ga_2O_3$ 5 to 55%) |
| $R_2O$ | 0 to 60% (R: at least one atom selected from Li, Na, K, and Cs) |
| R'O | 0 to 60% (R': at least one atom selected from Mg, Ca, Sr, and Ba) |
| $R_2O$ + R'O | 10 to 60% |
| ZnO | 0 to less than 25% |
| $Yb_2O_3$ | 0 to 7% |
| $GeO_2$ | 0 to 15% |
| $ZrO_2$ | 0 to 3.5% |
| $Ln_2O_3$ | 0 to 5% (Ln: at least one atom selected from Y, La, Gd, Lu, Sin, Dy, and Tm) and |
| $Sb_2O_3$ | 0 to 0.5%. |

5. The oxide glass capable of exhibiting a long lasting afterglow and photostimulated luminescence, as claimed in claim 3, which is represented, in terms of atoms for making up the glass, by the following chemical composition (mol %):

| | |
|---|---|
| $Ga_2O_3$ | 4 to 50% |
| $Al_2O_3$ | 0 to 25% ($Ga_2O_3$ + $Al_2O_3$ = 18 to 50%) |
| R'O | 24 to 65% (R': at least one atom selected from Mg, Ca, Sr, and Ba) |
| ZnO | 4 to 35% |
| $Tb_2O_3$ | 0.1 to 3% |
| $R_2O$ | 0 to 20% (R: at least one atom selected from Li, Na, K, and Cs) |
| $SiO_2$ | 0 to 10% |
| $GeO_2$ | 0 to 20% |
| $B_2O_3$ | 0 to 20% |
| $Yb_2O_3$ | 0 to 2%, |
| $ZrO_2$ | 0 to 3.5% |
| $Ln_2O_3$ | 0 to 3% (Ln: at least one atom selected from Y, La, Gd, Lu, Sm, Dy, Tm, and Pr) and |
| $Sb_2O_3$ | 0 to 0.5%. |

* * * * *